United States Patent Office 3,498,887
Patented Mar. 3, 1970

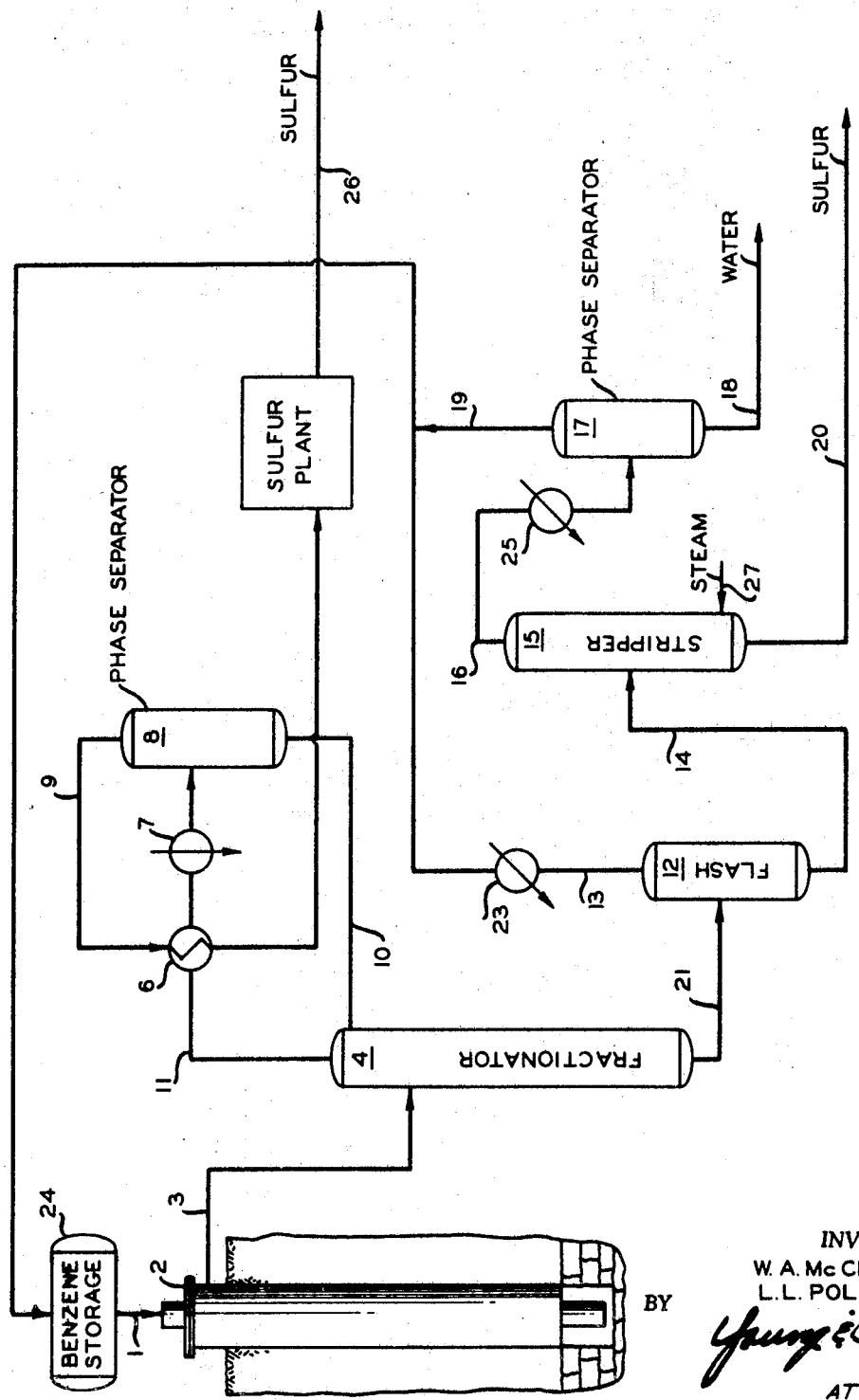

3,498,887
RECOVERY OF SULFUR AND HYDROGEN SULFIDE FROM ADMIXTURE WITH SOLVENT FROM GAS WELL BY PLURAL STAGE DISTILLATION OF SOLVENT
William A. McClintock and Leo L. Politte, Bartlesville, Okla., assignors to Phillips Petroleum Company, a corporation of Delaware
Filed Dec. 18, 1967, Ser. No. 691,493
Int. Cl. B01d 3/38, 11/00
U.S. Cl. 203—21                                    4 Claims

ABSTRACT OF THE DISCLOSURE

A gas well producing principally hydrogen sulfide, carbon dioxide and free sulfur is produced by pumping a solvent, e.g., benzene, into the well to dissolve free sulfur and the solvent is recovered for recycle by fractionation and steam distillation, the fractionating yielding substantially benzene-free hydrogen sulfide and carbon dioxide overhead which are passed to a sulfur producing plant and bottoms which are flashed and steam distilled recovering in an embodiment benzene overhead which is reused and molten sulfur as bottoms.

---

This invention relates to the recovery of sulfur and hydrogen sulfide. In one of its aspects, it relates to the recovery of sulfur and hydrogen sulfide from a solvent which has been used to remove sulfur from a gas well in which it is found, e.g., an acid-gas well. In an overall aspect, the invention relates to the production of an $H_2S$-containing gas well.

In one of its concepts, the invention provides a method for removing sulfur from a gas well by pumping into, through and from such a well a solvent, e.g., benzene, thus obtaining a well effluent containing hydrogen sulfide, carbon dioxide and sulfur, fractionating the well effluent to obtain an overhead rich in hydrogen sulfide and a bottoms rich in sulfur, treating the overhead to obtain a stream consisting essentially of hydrogen sulfide which can be processed as in a sulfur plant and a bottoms containing solvent, benzene in this instance; and flashing the fractionator bottoms to obtain a benzene vapor therefrom and a bottoms containing benzene and sulfur, steam stripping the last-mentioned bottoms to obtain therefrom benzene-free molten sulfur and benzene vapor, combining the benzene vapor just obtained with that obtained from the flashing and passing the combined benzene to the well for reuse. In another of its concepts, the hydrogen sulfide obtained from the fractionation overhead is heat interchanged with the fractionation overhead to provide at least an initial cooling of said overhead.

In a still further concept of the invention, the steam stripping to recover benzene results in a molten sulfur which can be pumped and otherwise handled as desired and because it is substantially benzene free need be submitted to no further treatment.

In a typical hydrogen sulfide gas well, it is possible to obtain enough acid gas to produce of the order of 90 to 100 tons per day of sulfur. Such a well would be flowing at a rate of about 4,000 M c.f.d. gas.

Such gas as here discussed will contain elemental sulfur and it is this elemental sulfur which is recovered along with the acid gas in the solvent and recovered from the solvent according to a concept of the invention.

Certain underground formations produce a gas which contains elemental sulfur in solution. Such wells are often difficult to produce continuously, because the sulfur comes out of the solution in the producing pipe or pipes and prevents the gas flowing. Indeed, the sulfur collects on the pipe walls until at some point it completely fills the pipe. Accordingly, a solvent such as benzene is used to remove more or less continuously from the well the sulfur which would otherwise collect in the pipe and cause difficulty.

It is an object of this invention to provide a method for the recovery of sulfur and hydrogen sulfide from a gas well. It is a further object of the invention to provide for the recovery of sulfur and hydrogen sulfide from a solvent used to recover these substances from a gas well. It is a further object of the invention to produce sulfur from hydrogen sulfide and sulfur contained in a solvent which has been used to recover these constituents from an acid-gas well.

Other aspects, concepts and objects of the invention are apparent from a study of this disclosure, the drawing, and the appended claims.

According to the present invention, there is provided a method for the recovery of sulfur and hydrogen sulfide from admixture with a solvent such as benzene with which these constituents have been recovered from a gas well containing the same which comprises the steps as follows: fractionating the solvent containing said constituents to obtain an overhead, recovering from the overhead essentially hydrogen sulfide gas which can be passed to a sulfur plant; also recovering from the fractionation a bottoms containing benzene and sulfur, flashing the bottoms to obtain benzene vapor therefrom and a liquid bottoms containing sulfur and benzene, steam stripping said bottoms to obtain additional benzene vapor and a benzene-free molten sulfur bottoms. The benzene vapor streams obtained are preferably condensed, combined and reused for treatment of the well.

Referring now to the drawing, benzene is pumped by pipe 1 into and through well 2. Benzene containing principally hydrogen sulfide, carbon dioxide and free sulfur is passed by pipe 3 to fractionator 4. In the embodiment here described, fractionator 4 is operated at a pressure of about 185 p.s.i.g., a bottoms temperature of 377° F. and an overhead temperature of 165° F. Overhead is passed by pipe 11 through heat exchangers 6 and 7 into phase separator 8. From phase separator 8 gaseous hydrogen sulfide is passed by 9 into exchanger 6 and from exchanger 6 to a sulfur producing plant. Bottoms from phase separator 8 are passed by pipe 10 as a reflux to fractionator 4. Heat exchanger 7 is refrigerated with liquid butane. The temperature in phase separator 8 is 58° F.

Returning to fractionator 4 bottoms from fractionator 4 at a temperature of 385° F. are passed by pipe 21 to flash tower 12. This tower is operated at a pressure of 25 to about 35 p.s.i.g. In the flash tower benzene vapor is released from the fractionator 4 bottoms and condensed by cooler 23. Bottoms from flash tower 12 are passed by pipe 14 to steam stripper 15 which in this embodiment is operated at about 30 p.s.i.g. and a bottoms temperature of 271° F. Benzene and water vapor are taken off overhead by pipe 16, condensed by cooler 25, and passed to separator 17 from which liquid benzene is taken overhead, combined with the condensed benzene vapor from flash tower 12 and passed to benzene storage 24. Condensate from separator 17 is removed at 18 and consists essentially of water. Benzene-free molten sulfur is removed from the system via pipe 20. This sulfur can be sent to further utilization because it is essentially on-specification sulfur.

The use of benzene has been described because it is the now preferred solvent. Solubility of the sulfur under the preferred non-reactive conditions of the invention is, of course, important to the efficient operation of the invention under a wide variety of conditions of operation. This is why benzene is the now preferred solvent. Other reasons might be given. Suffice to say that it is possible to operate the invention by replacing part or all of the benzene with other aromatic solvents possessing good sulfur solubility. Included are such solvents as toluene, the xylenes, and oils such as light cycle oils resulting from cracking or petroleum oil or other hydrocarbonaceous materials and which are, therefore, aromatic in character.

EXAMPLE

A typical material balance for the operation just described follows.

| Component | Stream No. | | | | | | | | | |
|---|---|---|---|---|---|---|---|---|---|---|
| | 3 | 9 | 21 | 13 | 14 | 16 | 27 | 20 | 19 | 26 |
| Sulfur, mols/day | 930 | 0 | 930 | 0 | 930 | 0 | | 930 | 0 | [1] 100 |
| Hydrogen sulfide, mols/day | 8,226 | 8,144 | 82 | 80 | 2 | 2 | | 0 | 2 | |
| Carbon dioxide, mols/day | 2,134 | 2,134 | 0 | 0 | 0 | 0 | | 0 | 0 | |
| Nitrogen, mols/day | 30 | 30 | 0 | 0 | 0 | 0 | | 0 | 0 | |
| Methane, mols/day | 164 | 164 | 0 | 0 | 0 | 0 | | 0 | 0 | |
| Benzene, mols/day | 7,926 | 30 | 7,896 | 3,812 | 4,084 | 4,064 | | 20 | 4,064 | |
| Water, mols/day | 256 | 128 | 128 | 40 | 88 | 2,064 | 2,000 | 24 | 20 | |
| Total, mols/day | 19,666 | 10,630 | 9,036 | 3,932 | 5,104 | 6,130 | 2,000 | 974 | 4,084 | [1] 100 |

[1] Tons/day.

In a copending application, Ser. No. 691,607, filed Dec. 18, 1967 by Oliver D. Crane, there is set forth a method for the recovery of sulfur and hydrogen sulfide from a stream of benzene containing the same which comprises flashing said stream to produce a vaporous stream containing hydrogen sulfide and some benzene and a bottoms stream containing sulfur and benzene, recovering hydrogen sulfide and benzene from said vaporous stream and subjecting said hydrogen sulfide to conditions to produce sulfur therefrom and fractionating said bottoms stream to recover benzene therefrom and sulfur yet containing some benzene.

Also in a copending application, Ser. No. 691,501, filed Dec. 18, 1967 by Maurice R. Dean and Henry B. Fisher, there is set forth a method for producing a gas well containing sulfur which comprises introducing into said well a solvent or medium which will take into itself the sulfur and then removing the solvent or medium from the well, separating gas from the solvent or medium and then treating the solvent or medium to recover sulfur therefrom.

Reasonable variation and modification are possible within the scope of the foregoing disclosure, the drawing and the appended claims to the invention, the essence of which is that there has been provided a method for the recovery of sulfur and hydrogen sulfide from an acid-gas well and from the solvent used in that well, the method comprising the steps of fractionating the solvent containing hydrogen sulfide, carbon dioxide and sulfur to obtain an overhead from which hydrogen sulfide is recovered as a product stream and a bottoms from which benzene is recovered and therefore can be reused and a benzene-free molten sulfur, the combination operation resulting in recovering substantially all of the benzene for reuse and therefore a hydrogen sulfide-free from benzene because the benzene from the overhead is used to reflux the fractionation.

We claim:
1. A method for the recovery of sulfur and hydrogen sulfide from a solvent containing the sulfur and hydrogen sulfide together in solution which comprises fractionally distilling said solvent to produce a vaporous stream containing hydrogen sulfide and a bottoms stream containing sulfur and solvent, recovering hydrogen sulfide from said vaporous stream, flashing said bottoms stream to obtain solvent vapor therefrom and a second bottoms stream, stripping said second bottoms stream to remove substantially all the remaining solvent therefrom to thus obtain a solvent-free molten sulfur.

2. A method according to claim 1 wherein said vaporous stream is cooled and condensed, subjected to a phase separation to obtain a gaseous hydrogen sulfide phase and a liquid phase, which liquid phase is returned to the fractionation as a reflux therefor.

3. A method according to claim 2 wherein the hydrogen sulfide phase is heat interchanged with the vaporous stream from the fractionation.

4. A method according to claim 3 wherein the solvent vapors obtained from said flashing and from said stripping are condensed and passed to an acid-gas well to produce solvent containing sulfur and hydrogen sulfide by dissolving into said solvent additional hydrogen sulfide and sulfur.

References Cited

UNITED STATES PATENTS

| | | | |
|---|---|---|---|
| 461,431 | 10/1891 | Frasch | 299—5 |
| 2,471,602 | 5/1949 | Arnold | 203—21 |
| 2,613,174 | 10/1952 | Ockert | 203—88 |
| 2,798,034 | 7/1957 | Egbert et al. | 23—312 |
| 2,809,885 | 10/1957 | Ditman et al. | 23—312 |
| 2,860,030 | 11/1958 | Goldtrap et al. | 23—181 |
| 3,042,503 | 7/1962 | Tuller et al. | 23—312 |
| 3,228,874 | 1/1966 | Morgan | 55—73 |
| 3,362,133 | 1/1968 | Kutsher et al. | 55—73 |
| 3,363,989 | 1/1968 | Deal et al. | 23—225 |
| 3,375,639 | 4/1968 | Miller et al. | 55—73 |

WILBUR L. BASCOMB, JR., Primary Examiner

U.S. Cl. X.R.

23—181, 225, 312; 203—78, 79, 80, 88; 299—5